US009401246B2

(12) United States Patent
Gadkaree et al.

(10) Patent No.: US 9,401,246 B2
(45) Date of Patent: *Jul. 26, 2016

(54) LITHIUM ION CAPACITORS AND METHODS OF PRODUCTION

(71) Applicant: CORNING INCORPORATED, Corning, NY (US)

(72) Inventors: Kishor Purushottam Gadkaree, Painted Post, NY (US); Xiarong Liu, Oneonta, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/722,439

(22) Filed: May 27, 2015

(65) Prior Publication Data

US 2015/0262761 A1 Sep. 17, 2015

Related U.S. Application Data

(63) Continuation of application No. 13/687,161, filed on Nov. 28, 2012, now Pat. No. 9,183,994.

(51) Int. Cl.
*H01G 11/06* (2013.01)
*H01G 11/62* (2013.01)
*H01G 11/32* (2013.01)
*H01G 11/50* (2013.01)
(Continued)

(52) U.S. Cl.
CPC .............. *H01G 11/06* (2013.01); *H01G 11/32* (2013.01); *H01G 11/34* (2013.01); *H01G 11/50* (2013.01); *H01G 11/62* (2013.01); *H01G 11/84* (2013.01); *H01M 4/382* (2013.01); *H01M 10/0566* (2013.01); *H01M 10/0568* (2013.01); *H01M 12/005* (2013.01); *H01M 4/0447* (2013.01); *H01M 4/1395* (2013.01); *H01M 4/366* (2013.01); *H01M 10/052* (2013.01); *Y02E 60/13* (2013.01); *Y10T 29/417* (2015.01)

(58) Field of Classification Search
None
See application file for complete search history.

(56) References Cited

U.S. PATENT DOCUMENTS 5,567,474 A 10/1996 Dover et al.
5,776,369 A 7/1998 Dover et al.
(Continued)

FOREIGN PATENT DOCUMENTS

EP 2372732 10/2011
WO 2004109823 12/2004
WO 2009029270 3/2009

OTHER PUBLICATIONS

AR S.R. Sivakkumar, et al., "Evaluation of Lithium-Ion Capacitors Assembled With Pre-Lithiated Graphite Anode and Activated Carbon Cathode", Electrochimica Acta, 2012, vol. 65, No. 280-287.
(Continued)

*Primary Examiner* — Dion R Ferguson
(74) *Attorney, Agent, or Firm* — John L. Haack; Michael W. Russell

(57) ABSTRACT

A lithium-ion capacitor may include a cathode, an anode, a separator disposed between the cathode and the anode, a lithium composite material, and an electrolyte solution. The cathode and anode may be non-porous. The lithium composite material comprises a core of lithium metal and a coating of a complex lithium salt that encapsulates the core. In use, the complex lithium salt may dissolve into and constitute a portion of the electrolyte solution.

16 Claims, 5 Drawing Sheets

(51) Int. Cl.
*H01M 4/38* (2006.01)
*H01M 10/0566* (2010.01)
*H01M 10/0568* (2010.01)
*H01M 12/00* (2006.01)
*H01G 11/34* (2013.01)
*H01G 11/84* (2013.01)
H01M 4/04 (2006.01)
H01M 4/1395 (2010.01)
H01M 4/36 (2006.01)
H01M 10/052 (2010.01)

(56) References Cited

U.S. PATENT DOCUMENTS

| | | | |
|---|---|---|---|
| 5,976,403 | A | 11/1999 | Dover et al. |
| 6,183,911 | B1 | 2/2001 | Kweon et al. |
| 6,201,685 | B1 | 3/2001 | Jerabek et al. |
| 6,212,062 | B1 | 4/2001 | Day et al. |
| 6,304,426 | B1 | 10/2001 | Wei et al. |
| 6,487,066 | B1 | 11/2002 | Niiori et al. |
| 6,565,701 | B1 | 5/2003 | Jerabek et al. |
| 6,714,391 | B2 | 3/2004 | Wilk et al. |
| 6,738,252 | B2 | 5/2004 | Okamura et al. |
| 7,385,801 | B2 | 6/2008 | Ando et al. |
| 7,443,651 | B2 | 10/2008 | Ando et al. |
| 7,588,523 | B2 | 9/2009 | Horner et al. |
| 2002/0176677 | A1 | 11/2002 | Kumar et al. |
| 2004/0085710 | A1 | 5/2004 | Takeuchi et al. |
| 2006/0057433 | A1 | 3/2006 | Ando et al. |
| 2007/0002524 | A1 | 1/2007 | Ando et al. |
| 2008/0055819 | A1 | 3/2008 | Taguchi et al. |
| 2008/0094778 | A1 | 4/2008 | Tanizaki et al. |
| 2008/0165471 | A1 | 7/2008 | Kojima et al. |
| 2008/0220329 | A1 | 9/2008 | Kojima et al. |
| 2008/0273852 | A1 | 11/2008 | Parker et al. |
| 2009/0023066 | A1 | 1/2009 | Kojima et al. |
| 2009/0027831 | A1 | 1/2009 | Tasaki et al. |
| 2009/0029257 | A1 | 1/2009 | Ando et al. |
| 2009/0214949 | A1 | 8/2009 | Ugawa |
| 2011/0052129 | A1 | 3/2011 | Sasaoka |
| 2012/0057274 | A1 | 3/2012 | Kim et al. |
| 2012/0063059 | A1 | 3/2012 | Ra et al. |
| 2012/0212897 | A1 | 8/2012 | Lo |
| 2013/0122318 | A1 | 5/2013 | Wietelmann |

OTHER PUBLICATIONS

"Fiber Optics Give the Inside Story", Advanced Composites Engineering, Winter 1987, p. 17.

T. Horiguchi, et al., "Measurement of Temperature and Strain Distribution by Brillouin Frequency Shift in Silica Optical Fibers", SPIE, vol. 1797, Distributed and Multiplexed Fiber Optical Sensors II, 1992, pp. 2-13.

J. Yu, et al., "Analysis of Brillouin Frequency Shift and Longitudinal Acoustic Wave in a Silica Optical Fiber With a Triple-Layered Structure", Journal of Lightwave Technology, vol. 21, No. 8, Aug. 2003, pp. 1779-1786.

T. Tjugiarto, et al., "Bandpass Filtering Effect in Tapered Asymmetrical Twin-Core Optical Fibres", Electronics Letters, June 10, 1993, vol. 29, No. 12, pp. 1077-1078.

M.T.V. Wylie, et al., "Fiber Optic Distributed Differential Displacement Sensor", Journal of Lightwave Technology, Sep. 15, 2011, vol. 29, No. 18, pp. 2847-2852.

Jun. 2, 2014 International Search Report Issued in Counterpart Application No. PCT/US2013/071422.

Jun. 2, 2014 Written Opinion of the International Searching Authority Issued in Counterpart Application No. PCT/US2013/071422.

LITHIUM ION CAPACITORS AND METHODS OF PRODUCTION

This application is a continuation of U.S. patent application Ser. No. 13/687,161 filed on Nov. 28, 2012, the content of which is relied upon and incorporated herein by reference in its entirety, and the benefit of priority under 35 U.S.C. §120 is hereby claimed.

BACKGROUND

1. Field

The present disclosure relates generally to electrochemical energy storage devices, and more specifically to lithium-ion capacitors and their methods of production.

2. Technical Background

Capacitors, including double layer capacitors, have been utilized in many electrical applications where a pulse of power is required. Some lithium-ion capacitors may have a significantly higher power density than standard ultracapacitors. However, many ultracapacitors have a relatively low energy density for selected purposes.

Lithium-ion capacitors contain a faradaic electrode (anode) and an activated carbon electrode (cathode) where there are no faradaic reactions. These capacitors have advantages associated with a battery (with respect to their high energy density) and a capacitor (with respect to their high power capability). For instance, lithium-ion capacitors can provide higher operating voltage (~3.8-4V) compared to an EDLC device voltage of 2.5 to 2.7V.

Lithium-ion capacitors have been proposed to address the insufficient energy density in ultracapacitors and other standard capacitors. For lithium-ion based capacitors, currently-proposed models require that a lithium metal electrode, in addition to a cathode and an anode, be incorporated into the device. The result is an electrochemical energy storage device with three electrodes (cathode, anode, and lithium metal electrode).

Such three electrode devices require the use of a porous cathode in conjunction with a mesh-type current collector in order to facilitate transport of lithium into and within the cell. The fabrication of porous electrodes and the construction of the overall three-electrode capacitor design can be complicated, and such a cell may be expensive to manufacture. Additionally, the presence of a lithium metal electrode in the capacitor presents design challenges, as lithium metal is potentially combustible in the presence of air.

BRIEF SUMMARY

In accordance with embodiments of the present disclosure, a lithium-ion capacitor comprises a non-porous cathode, a non-porous anode, a separator positioned between the cathode and the anode, a lithium composite material positioned between the anode and the separator, and an electrolyte solution. The electrolyte solution comprises an electrolyte material (solute) dissolved in a solvent. The lithium composite material comprises a lithium metal core and a layer of a complex lithium salt encapsulating the core.

In the assembled structure, the solvent may dissolve the complex lithium salt such that the electrolyte material comprises or consists essentially of the complex lithium salt. The lithium composite material may be a source of both electrolyte material and lithium for the capacitor, e.g., a sole source of lithium.

Following dissolution of the lithium composite material, in a further embodiment, a lithium-ion capacitor comprises a non-porous cathode, a non-porous anode, a separator positioned between the cathode and the anode, and an electrolyte solution.

Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
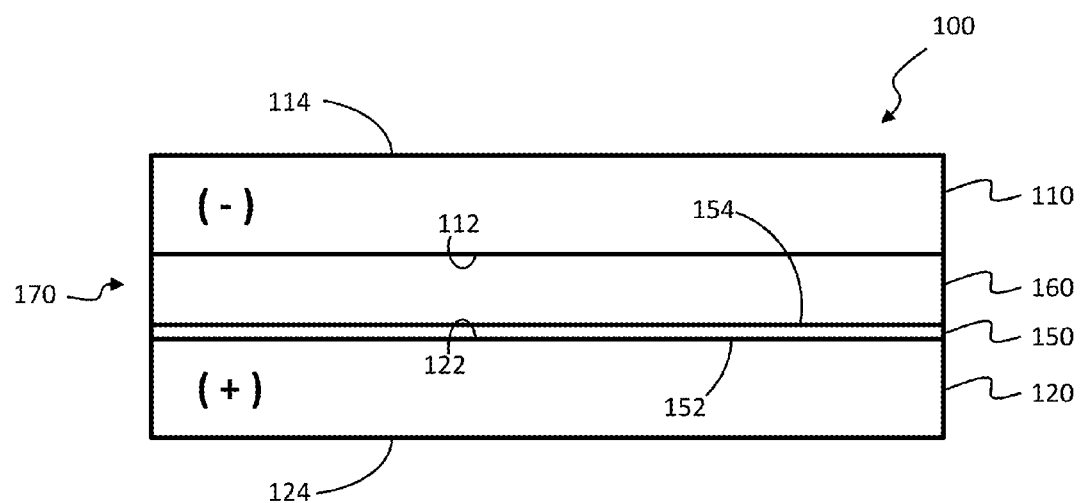
FIG. 1 is a schematic diagram of a lithium-ion capacitor according to embodiments.

Reference will now be made in greater detail to various embodiments of the subject matter of the present disclosure, some embodiments of which are illustrated in the accompanying drawings. Whenever possible, the same reference numerals will be used throughout the drawings to refer to the same or similar parts.

The lithium-ion capacitors disclosed herein may comprise a non-porous cathode, a non-porous anode, a separator positioned between the cathode and the anode, a lithium composite material positioned between the anode and the separator, and an electrolyte solution. The electrolyte solution includes an electrolyte material (solute) dissolved in a solvent. The lithium composite material comprises a lithium metal core and a layer of a complex lithium salt encapsulating the core.

In one embodiment, the lithium composite material may include a plurality of stabilized lithium composite particles each having a core and a coating material of a complex lithium salt surrounding and encapsulating the core. Incorporation of the lithium composite material into the capacitor eliminates the need for a separate lithium metal electrode. In some embodiments, the electrochemical performance of the capacitor may be improved due to the lack of a lithium metal electrode and the attendant volume and weight savings for the overall cell.

In constructing the lithium-ion capacitor, a lithium composite material may be used as a source of at least a portion of the electrolyte material and at least a portion of the lithium metal used by the cell. For example, the complex lithium salt that encapsulates the lithium metal core of the composite particles may dissolve in the electrolyte solvent of an assembled cell and constitute a portion, or substantially all, of the electrolyte material in the electrolyte solution. These as well as other benefits of the lithium-ion capacitors of the current disclosure are described in detail herein.

Referring now to FIG. 1, a lithium-ion capacitor 100 according to one embodiment comprises a cathode 120, an anode 110, and a separator 150 in a stacked configuration. The cathode 120 may comprise an outer surface 124 and a separator-facing surface 122, and the anode 110 may comprise an outer surface 114 and a separator-facing surface 112. As illustrated, the separator 150 is positioned between the cathode 120 and the anode 110, such that the separator comprises a cathode-facing surface 152 and an anode facing surface 154.

The separator 150 may be a lithium ion-permeable membrane configured to be positioned between the cathode 120 and anode 110 that keeps the anode and cathode from contacting each other.

The cathode 120 includes a cathode material that may comprise activated carbon, or any other suitable cathode material for a lithium-ion capacitor. As used herein, an activated carbon material has a specific surface area greater than about 500 $m^2/g$.

The anode 110 includes an anode material that may comprise graphite, carbon black, hard carbon, coke, or combinations thereof. Hard carbon material, as used herein, has a specific surface area less than about 500 $m^2/g$. In some embodiments, the cathode 120 and anode 110 may be non-porous, and may be impermeable to liquids including solvents used to form an electrolyte solution. The cathode 120 and anode 110 may be attached to respective positive and negative current collectors (not shown).

The cathode 120, anode 110 and current collectors when assembled may collectively be referred to as an electrode set. In conventional lithium-ion capacitors, the electrode set may further comprise a lithium metal electrode. According to the present disclosure, lithium-ion capacitor 100 does not contain a lithium metal electrode. In some embodiments, the electrode set may consist essentially of cathode 120 and anode 110, or consist essentially of a cathode 120, anode 110, and respective current collectors.

A liquid electrolyte solution 170 may be incorporated between the cathode 120 and anode 110 such that the electrolyte solution permeates the separator 150. The electrolyte solution 170 may comprise an electrolyte material (solute) dissolved in a suitable solvent. The electrolyte material may be any material capable of functioning in an electrochemical device. In embodiments, the electrolyte material may be a lithium salt, i.e., a complex lithium salt such as $LiPF_6$, $LiBF_4$, $LiClO_4$, $LiAsF_6$, or $LiF_3SO_3$, as well as mixtures thereof. Example solvents for forming an electrolyte solution include organic solvents or mixtures of organic solvents such as dimethyl carbonate, methyl propionate, ethylene carbonate, propylene carbonate, diethyl carbonate as well as other solvents suitable for use in an electrolyte where the lithium-ion is the charge carrier. In some embodiments, the solvent may be capable of dissolving the electrolyte material of the lithium composite material.

A complex lithium salt is any ionic compound comprising lithium and an additional metal, metalloid or non-metal atom that does not itself ionize and which is soluble in an organic solvent. For instance, $LiPF_6$ contains lithium and phosphorus as metal atoms, but the phosphorus does not ionize by itself. Rather, phosphorus ionizes as the $PF_6^-$ ion. In a further example, $LiBF_4$ contains lithium metal and the metalloid boron. Although lithium-ionizes ($Li^+$), boron does not ionize by itself, but as the $BF_4^-$ ion. In a still further example, $LiClO_4$ contains lithium metal and the non-metal atoms chlorine and oxygen. The non-metal atoms ionize as the perchlorate ion ($ClO_4^-$). The solvent may be any suitable solvent for use in an electrochemical energy storage device.

The composite lithium particles 160 may be positioned between the cathode 120 and the anode 110. In the illustrated embodiment, the composite lithium particles 160 are disposed on a separator-facing surface 112 of anode 110. In a related embodiment, the composite lithium particles 160 are disposed on anode facing surface 154 of separator 150. The composite lithium particles may be incorporated into the device as a contiguous layer on or both of a surface of the anode or a surface of the separator.

The amount of composite lithium particles incorporated into the device may be chosen to provide the desired amount of lithium metal (from the core of the composite particles), the desired amount of electrolyte material (from the complex lithium salt layer that encapsulates the core), or both.

A weight ratio of lithium metal to anode (e.g., lithium: graphite) may be in the range of about 1:2 to 1:10, e.g., 1:2, 1:3, 1:4, 1:5, 1:6, 1:7, 1:8, 1:9 or 1:10, or any range between any two ratios disclosed. In one embodiment, the weight ratio of lithium metal to anode (e.g., graphite) may be in the range of about 1:3 to 1:6.

An as-assembled lithium-ion capacitor according to embodiments includes an anode, a cathode, a separator disposed between the anode and the cathode, and lithium composite particles disposed between the anode and the separator. Upon addition of a liquid electrolyte (or electrolyte solvent) to the system, the lithium salt that coats the lithium composite particles may dissolve into and thus form a component of the electrolyte solution. The electrolyte solvent may be selected and provided in an amount sufficient to contact and dissolve the complex some or substantially all of the lithium salt of the lithium composite material 160.

One method of forming a lithium-ion capacitor comprises assembling an electrode set comprising an anode, a cathode, a separator disposed between the anode and the cathode, and lithium composite particles disposed between the anode and the separator and then adding an electrolyte solution to the assembly. A further method of forming a lithium-ion capacitor comprises assembling the foregoing electrode set and adding an electrolyte solvent to the assembly.

During use, i.e., as a consequence of charging and discharging the cell, the complex lithium salt coating on the lithium composite particles may completely dissolve into and form a component of the electrolyte solution.

The lithium composite particles described herein generally comprise a core and a coating that encapsulates the core. The core may comprise lithium metal or a lithium metal alloy. The coating, which comprises a lithium salt, surrounds and encapsulates the core. The coating may be hermetic and thus prevent or substantially inhibit water or air, including oxygen, from contacting and reacting with the core. A stabilized lithium composite material may be substantially non-reactive or non-combustive if exposed to air, oxygen or water, such as an ambient environment. Thus, in embodiments the composite particles are stabilized with respect to ambient exposure.

Figure 2:
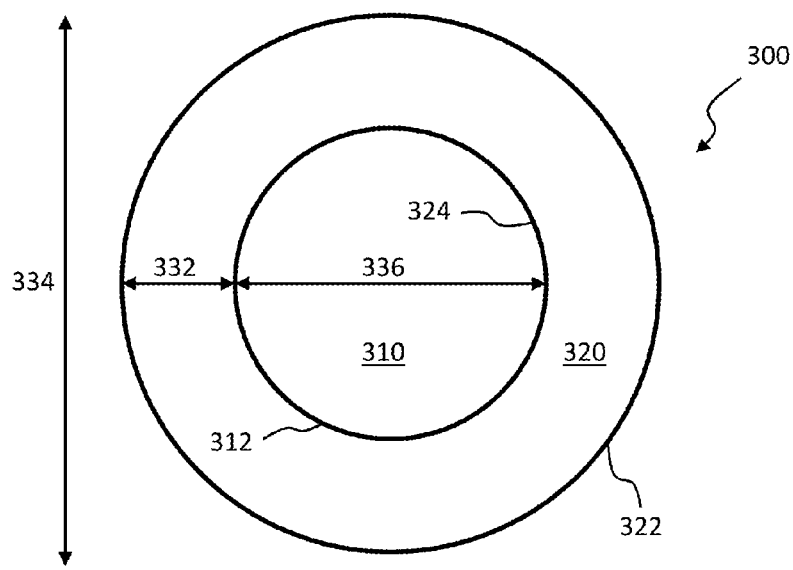
FIG. 2 is a cross-sectional view of a lithium composite particle.

A single, stabilized lithium composite particle 300 is shown schematically in cross-section in FIG. 2. Particle 300 includes a core 310 and a coating 320 that completely surrounds and encapsulates the core. The core 310 may comprises a unitary body defining an outer surface 312. The coating 320 is in direct physical contact with the outer surface 312 of the core 310 along an inner surface 324 of the coating 320. The coating is inorganic and is free of organic species such as mineral oil.

The core 310 in some embodiments comprises lithium metal, sometimes referred to as elemental lithium. In further embodiments, the core may comprise an alloy of lithium. Examples of such alloys comprise lithium and one or more of Al, Si, Ge, Sn, Pb and Bi. The coating 320 comprises a lithium salt that may include a complex lithium salt such as $LiPF_6$, $LiBF_4$, $LiClO_4$, $LiAsF_6$, or $LiF_3SO_3$, as well as mixtures thereof. Such a salt is soluble in standard organic solvents, including dimethyl carbonate, methyl propionate, ethylene carbonate, propylene carbonate, and diethyl carbonate.

As illustrated in FIG. 2, the core 310 has a particle size 336, and the stabilized lithium particle 300 has a particle size 334. The term "particle size" is used to describe the maximum linear dimension associated with a particle. In the case of a spherical particle, for example, the particle size is the diameter. In the case of an oblong particle, the particle size is the "length" of the particle. An example average particle size for a plurality of composite particles 300 may range from about 5 microns to 500 microns, e.g., 5, 10, 20, 50, 300, 150, 200, 300, 400 or 500 microns, and may be defined for a given material batch over a range of any two of the aforementioned values.

The coating 320 has a thickness 332 defined as the average shortest distance between the inner surface 324 of the coating and the outer surface 322 of the coating. In embodiments, the coating may have a substantially uniform thickness or a variable thickness depending, for example, on the method used to form the coating. An example average thickness for the coating 324 may range from about 10 nm to 300 microns, e.g., 0.01, 0.02, 0.05, 0.1, 0.2, 0.5, 1, 2, 5, 10, 20, 50 or 300 microns, which may be defined for a given material batch over a range of any two of the aforementioned values.

In some embodiments, the stabilized lithium composite particle 300 may be substantially spherically shaped. However, other shapes are contemplated herein, such as, but not limited to asymmetric shapes or spheroids.

The stabilized lithium composite particles 300 are substantially non-reactive or non-combustive if exposed to air, oxygen or water. The coating 320 encapsulates the lithium core 310 to substantially inhibit or prevent exposure and reaction of the lithium with ambient gases or liquids. The stabilized lithium composite particles 300 may be substantially chemically inert, for example, to ambient exposure or to elevated temperature (e.g., 50° C., 300° C., 150° C. or even 200° C.) exposure to air, oxygen or water vapor. The stabilized lithium composite particles may be sufficiently stable to be stored in air for at least one week, 2 weeks, 1 month, or even a year without substantial chemical degradation and/or combustion.

Stabilized lithium composite particles may be produced by providing lithium metal particles, and contacting the lithium metal particles with a coating solution that includes a coating material dissolved in a solvent. The coating material may include a lithium salt or complex lithium salt as described above. The contacting may be performed by immersing the particles in the solution or by other means such as spray coating. After coating the particles, the solvent is removed to form a layer of the coating material over the lithium metal particles. Removal of the coating solvent may be performed by evaporation.

Due to its high reactivity and flammability, lithium metal is often stored under the cover of a viscous hydrocarbon such as mineral oil. While the mineral oil encapsulant inhibits degradation of the lithium metal, it is generally incompatible with most solid state devices. With the present stabilization approach, the lithium particles are safe to handle and store, and can be incorporated into a lithium-ion device directly in their stabilized form.

In an embodiment, stabilized lithium composite particles may be produced by initially providing lithium metal or lithium metal-containing particles that are immersed in mineral oil. Prior to forming the inorganic coating over the particles, the mineral oil is stripped from the particles. By way of example, the mineral oil may comprise silicone oil. Lithium metal particles suspended in silicone oil are commercially available from Sigma-Aldrich of St. Louis, Mo.

Mineral oils such as silicon oil may be removed from the lithium particles by washing with a suitable cleaning solvent such as tetrahydrofuran (THF) or methylene chloride. A vacuum filtration system, for example, may be used to wash the lithium particles. Due to the volatility of the lithium, both the washing to remove an organic encapsulant and the act of contacting the lithium metal particles with a coating solution comprising a lithium metal salt to form the inorganic encapsulant can be carried out in a controlled atmosphere such as a glove box that is free or substantially free of oxygen and water. Prior to contacting the lithium metal particles with a coating solution, the washed lithium particles can be dried. The washed particles can be dried by heating the particles to evaporate the solvent, e.g., up to a drying temperature of about 300° C.

To form the inorganic coating, a lithium salt is initially dissolved in a coating solvent to form a coating solution. Suitable solvents are capable of dissolving the lithium salt. Example coating solvents include THF, n-methyl pyrrolidone (NMP), methylene chloride, or combinations thereof.

After contacting the lithium particles with the coating solution, the coating solvent can be removed to form a coating of the lithium salt over the particles. The solvent may be removed by evaporation, which may either occur naturally under environmental conditions of the preparation process or may be forced through various techniques including vacuum techniques. For example, THF may be liberated through evaporation at room temperature and with no vacuum. In a further example, NMP may be removed by heating optionally with the application of vacuum. In various embodiments, removal of the coating solvent may be performed at room temperature or by heating to a temperature of at most about 150° C., e.g., about 30, 50, 75 or 300° C.

The thickness 332 of the coating 320 may be determined by controlling the concentration of the lithium salt in the coating solution. Generally, a higher salt content in the solution will produce a thicker coating. A concentration in the coating solution of the lithium salt may range from about 0.1 to 4 molar, e.g., 0.1, 0.2, 0.5, 1, 2, 3 or 4 molar. In embodiments, the coating solution comprises a saturated solution of the lithium salt.

In the resulting stabilized lithium composite particles, the lithium salt coating may comprise from about 1 to 50 wt. % of the total mass of the particles. For instance, the coating may comprise 1, 2, 5, 10, 20, 30, 40 or 50 wt. % of the total mass. Together with the composition, this thickness of the coating is chosen to provide an effective barrier to the diffusion of air, oxygen and water.

EXAMPLES

Example 1

Lithium-ion button cell capacitors were prepared with various ratios of lithium metal to graphite (anode material) in Samples 1-4.

To form the anode, a graphite slurry was prepared by mixing 100 g graphite powder (Aldrich), 2 g carbon black (Cabot Corporation), 10 g polyvinylidene fluoride (PVDF) (Alfa Aesar) and 190 g N-methyl-2-pyrrolidone (NMP) solvent (Sigma-Aldrich) to form a smooth slurry. The slurry was dispersed to a thickness of about 1 mm onto copper foil using a doctor-blade. The graphite slurry-coated copper foil was initially dried in a fume hood, vacuum dried in a 120° C. oven, and then diced into 1.4 cm diameter electrodes. The typical thickness of the graphite electrodes (graphite plus copper current collector) was about 17 mm.

To form the cathode, activated carbon films were made by grinding activated carbon powder and PTFE binder at a ratio of 90:10 by weight at a speed of 350 rpm to form a mixture that was rolled into a thin sheet. A typical thickness of the activated carbon layer was about 13 mm. The activated carbon was laminated onto aluminum foil (1 mil thickness) using carbon ink, and the resulting laminate was cut into 1.4 cm diameter electrodes.

Lithium composite particles were provided having a lithium metal core and a $LiPF_6$ layer encapsulating the core. Commercially-available lithium metal particles in silicone oil were first washed and filtered with THF under controlled atmosphere to remove the silicone oil. The particles were dried and transferred to a dish containing a 2M coating solution of $LiPF_6$ dissolved in THF. The solvent evaporates under ambient conditions to produce stabilized, $LiPF_6$-coated lithium composite particles. The amount and concentration of the coating solution was controlled to produce composite particles where, upon drying, the weight ratio of $LiPF_6$ (coating) to lithium metal (core) is about 20:80.

Sample 1. The lithium-ion capacitor included 68.0 mg graphite, 35.1 mg activated carbon, and 6.8 mg lithium composite particles comprising 20% $LiPF_6$. The mass ratio of lithium composite particles to graphite was 1:10.

Sample 2. The lithium-ion capacitor included 73.3 mg graphite, 34.4 mg activated carbon, and 13.9 mg lithium composite particles comprising 20% $LiPF_6$. The mass ratio of lithium composite particles to graphite was 1:5.27.

Sample 3. The lithium-ion capacitor included 66.6 mg graphite, 32.9 mg activated carbon, and 22.1 mg lithium composite particles comprising 20% $LiPF_6$. The mass ratio of lithium composite particles to graphite was 1:3.

Sample 4. The lithium-ion capacitor included 66.5 mg graphite, 35.2 mg activated carbon, and 31.6 mg lithium composite particles comprising 20% $LiPF_6$. The mass ratio of lithium composite particles to graphite was 1:2.1.

Lithium-ion capacitors were assembled using CR2032 button cell cases with Al-clad (MTI Corporation) packages. The stacked electrode set included, in order, aluminum current collector/activated carbon cathode/paper separator/lithium composite particles/graphite anode/copper current collector. The electrolyte solution (~0.3 g of electrolyte per button cell) was prepared using a 1M solution of $LiPF_6$ in a 1:1 by volume mixture of ethylene carbonate (EC) and dimethyl carbonate (DMC) solvents.

The lithium-ion button cell capacitors were first tested using cyclic voltammetry at a scan rate of 1 mV/s, with an operating voltage ranging from 2.2V to 3.8V. The capacities of lithium-ion capacitors were determined at constant current discharge (1 mA) after holding at 3.8V for 2 h. Power capabilities were measured at various currents after holding at 3.8V for 1 h. Energy and power densities based the volume of electrodes and separators were calculated by integrating discharge curves.

Summarized in Table 1 are energy and power density data for the lithium-ion capacitor Samples 1-4. It can be seen that higher energy densities were obtained for Samples 2 and 3. A dramatically lower energy density was obtained for Sample 4. At the high loading ratio of Sample 4, lithium metal may not be completely incorporated into the graphite anode such that the unincorporated lithium may influence the insertion-deinsertion of $Li^+$, resulting in lower energy density. At a ratio of 1:10 (Sample 1), the energy density of the lithium-ion capacitor is slightly lower than that for Samples 2 and 3. However, the power density of Sample 1 is slightly greater than the power density of Samples 2 and 3.

Figure 3:
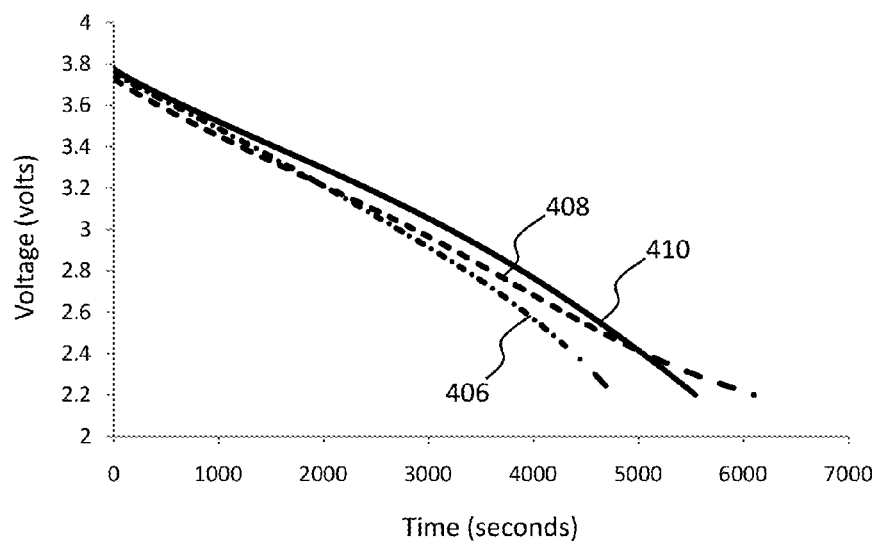
FIG. 3 is a plot of constant-current discharge curves for example lithium-ion capacitors according to one embodiment.

Based on these data, lithium-ion capacitors with graphite negative electrodes can have a wide mass ratio range, e.g., from about 1:3 to 1:10. FIG. 3 shows constant current (1 mA) discharge curves for Samples 1, 3 and 4. The linear behavior of the data in FIG. 3 is consistent with good capacitive behavior at higher voltages.

TABLE 1

| Energy and Power density data for button cell electrodes with different lithium:graphite mass ratios | | | | |
| --- | --- | --- | --- | --- |
| Sample Number | 1 | 2 | 3 | 4 |
| Lithium composite particles:graphite electrode weight ratio | 1:10 | 1:5.27 | 1:3 | 1:2.1 |
| Energy Density (Wh/l) | 35.8 | 37.9 | 38.5 | 31.5 |
| Power Density (W/l) | 23.3 | 21.2 | 22.8 | 23.8 |
| FIG. 3 reference number | 410 | N/A | 408 | 406 |

Example 2

Lithium-ion button cell capacitors were prepared using hard carbon as the anode material.

Sample 5. Ground phenolic resin was heated to 660° C. at a heating rate of 200° C./hour, held at 660° C. for 2 hours to carbonize the resin, and then cooled to room temperature. The thermal cycle was performed under $N_2$ atmosphere with a gas flow rate of 6.18 l/min. The resulting carbon was soaked in 37% HCl overnight and rinsed with deionized water to remove trace impurities. The sample was further soaked in a 29% $NH_4OH$ aqueous solution overnight, followed by rinsing with deionized water. Carbon slurry was prepared using 100 g of the resulting carbon, 10 g polyvinylidene fluoride (PVDF), 2 g carbon black and 190 g NMP solvent.

The lithium-ion capacitor of Sample 5 included 35 mg activated carbon (cathode), 48 mg of the above-described hard carbon (anode), and 13.2 mg lithium composite particles comprising 20% $LiPF_6$.

Sample 6. Ground phenolic resin was heated to 1000° C. at a heating rate of 200° C./hour, held at 1000° C. for 2 hours to carbonize the resin, and then cooled to room temperature. The thermal cycle was performed under N₂ atmosphere with a gas flow rate of 6.18 l/min. The resulting carbon was soaked in 37% HCl overnight and rinsed with deionized water to remove trace impurities. The sample was further soaked in a 29% NH₄OH aqueous solution overnight, followed by rinsing with deionized water. The purified carbon was heated at 1000° C. for 2 hours under N₂ atmosphere. Carbon slurry was prepared using 42.5 g of the resulting carbon, 5 g PVDF, 2.5 g carbon black and 120 ml NMP solvent.

The lithium-ion capacitor of Sample 6 included of 34 mg activated carbon (cathode), 43 mg of the above-described hard carbon (anode), and 13.4 mg lithium composite particles comprising 20% LiPF₆.

Sample 7. Ground phenolic resin was heated to 660° C. at a heating rate of 200° C./hour, held at 660° C. for 2 hours to carbonize the resin, and then cooled to room temperature. The thermal cycle was performed under N₂ atmosphere with a gas flow rate of 6.18 l/min. Carbon slurry was prepared using 42.5 g of the carbon, 5 g PVDF, 2.5 g carbon black and 150 ml NMP solvent.

The lithium-ion capacitor of Sample 7 included 36 mg activated carbon (cathode), 52 mg of the above-described hard carbon (anode), and 12.4 mg lithium composite particles comprising 20% LiPF₆.

Sample 8. Wheat flour was heated to 1000° C. at a heating rate of 200° C./hour, held at 1000° C. for 2 hours to carbonize the flour, and then cooled down to room temperature. The thermal cycle was performed under N₂ atmosphere with a gas flow rate of 6.18 l/min. The carbon was soaked in 37% HCl overnight and rinsed with deionized water to remove trace impurities. The sample was further soaked in 29% NH₄OH overnight, followed by rinsing with deionized water. The purified carbon was treated at 1000° C. for 2 hours under N₂ atmosphere. Carbon slurry was prepared using 42.5 g of the carbon sample, 5 g PVDF, 2.5 g carbon black and 150 ml NMP solvent.

The lithium-ion capacitor of Sample 8 included 35 mg activated carbon (cathode), 42 mg of the above-described wheat flour-derived hard carbon (anode), and 14.2 mg lithium composite particles comprising 20% LiPF₆.

Performance of the hard carbon-based capacitors was measured by cyclic voltammetry and constant current discharging. Energy and power densities of lithium-ion capacitors based on the volume of electrodes and separators were calculated by an integration method. The reported energy and power densities are average results of two lithium-ion capacitors.

Table 2 summarizes average energy density and power density of lithium-ion capacitors as a function of discharge current. It can be seen that energy densities at 0.001 A for Samples 5, 6, and 8 range from 34.8 Wh/l to 36.2 Wh/l, while the energy density for the lithium-ion capacitor of Sample 7 is only 25.3 Wh/l.

TABLE 2

Energy and power density data for hard carbon-containing button cell electrodes as a function of discharge current.

| Current (A) | Sample 5 - resin 660° C., washed | | Sample 6 - resin 1000° C., washed | | Sample 7 - resin 660° C., unwashed | | Sample 8 - Wheat flour 1000° C., washed | |
|---|---|---|---|---|---|---|---|---|
| | energy density (Wh/l) | power density (W/l) | energy density (Wh/l) | power density (W/l) | energy density (Wh/l) | power density (W/l) | energy density (Wh/l) | power density (W/l) |
| 0.001 | 35.9 | 22.8 | 36.2 | 23.6 | 25.3 | 22.5 | 34.8 | 25.0 |
| 0.005 | 33.1 | 112.2 | 34.2 | 117.1 | 18.7 | 111.1 | 32.7 | 124.1 |
| 0.01 | 29.1 | 219.5 | 31.0 | 230.5 | 14.0 | 214.9 | 28.0 | 243.7 |
| 0.02 | 21.4 | 420.4 | 25.3 | 446.3 | 8.7 | 405.2 | 19.6 | 470.6 |
| 0.05 | 6.4 | 961.4 | 12.3 | 1033.6 | 1.9 | 928.7 | 6.0 | 1103.2 |
| 0.1 | N/A | N/A | 2.8 | 1938.4 | N/A | N/A | 1.0 | 2043.4 |

Comparing the data for sample 5 with the data for sample 7 illustrates the beneficial effects of a washing step. Comparing the data for sample 5 with the data for sample 6 shows that increasing the process temperature from 660° C. to 1000° C. increases the energy density for higher discharge rates (e.g., 0.05 Amps, which is relevant to high power applications). Comparing the data for sample 6 with the data for sample 8 shows that the synthetic resin-based carbon outperforms wheat flour-based carbon.

In an embodiment, the capacitor comprises a hard carbon-based anode where the hard carbon is derived from synthetic material (phenolic resin) that is carbonized at high temperature (~1000° C.) and additionally washed with ammonia and hydrochloric acid, i.e., sample 6.

Figure 4:
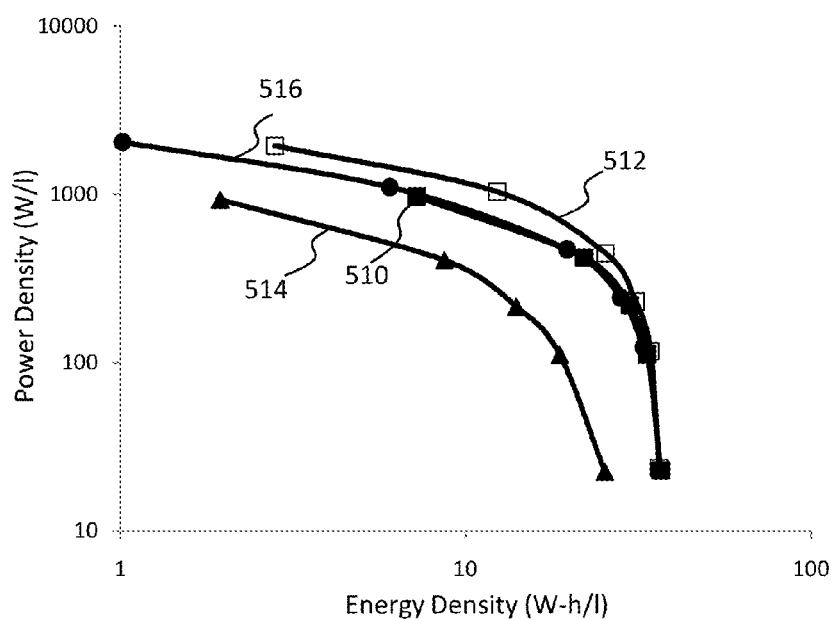
FIG. 4 is a series of Ragone plots for example lithium-ion capacitors.
Figure 5:
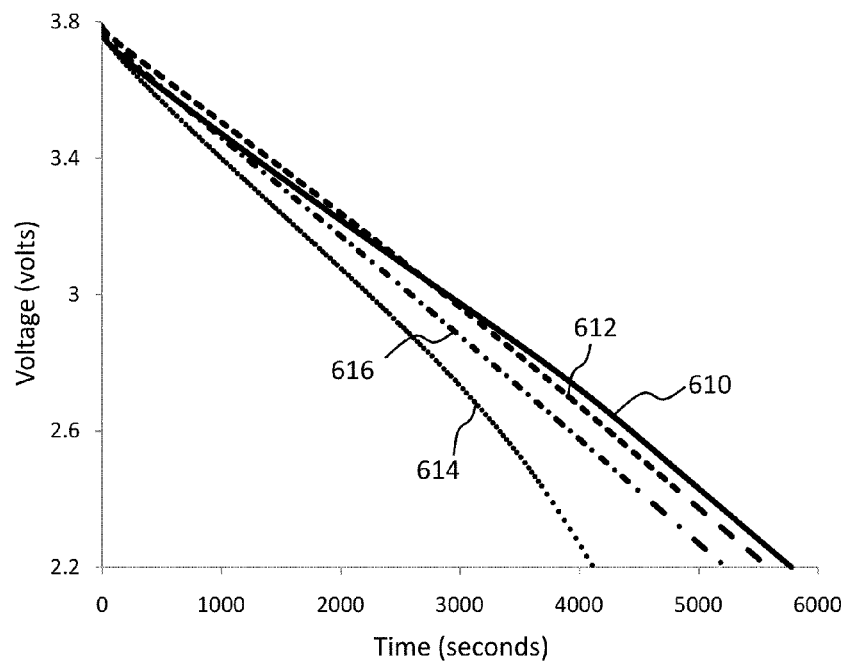
FIG. 5 is a series of constant-current discharge curves for example lithium-ion capacitors according to a further embodiment.

FIG. 4 is a Ragone plot (power density versus energy density) and FIG. 5 shows constant current discharge curves at 1 mA for Samples 5-8. Reference numerals identifying Samples 5-8 in FIGS. 4 and 5 are summarized in Table 3.

TABLE 3

Summary of reference numerals.

| Sample Number | 5 | 6 | 7 | 8 |
|---|---|---|---|---|
| FIG. 4 Reference Number | 510 | 512 | 514 | 516 |
| FIG. 5 Reference Number | 610 | 612 | 614 | 616 |

Figure 6:
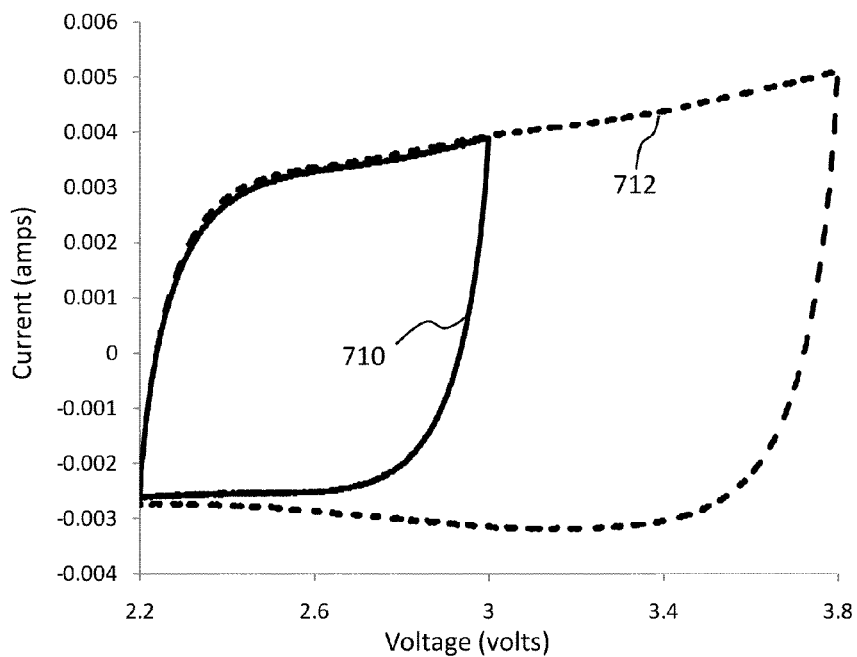
FIG. 6 shows cyclic voltammograms of example lithium-ion capacitors.

FIG. 6 shows successive cyclic voltammograms of the lithium-ion capacitor of Sample 6. A first cycle is shown as line 710 and a second cycle is shown as line 712. It can be seen that the voltammograms have a rectangle shapes, which indicates that the lithium-ion capacitor had good capacitive behavior.

Example 3

Lithium metal particles in silicone oil were first washed and filtered with THF under controlled atmosphere to remove the silicone oil. The particles were dried and transferred to a dish containing a 2M coating solution of LiPF₆ dissolved in THF. The solvent evaporates under ambient conditions to produce stabilized, LiPF₆-coated lithium composite particles. The amount and concentration of the coating solution was controlled to produce composite particles where, upon drying, the weight ratio of LiPF$_6$ (coating) to lithium metal (core) is about 20:80.

Figure 7A:
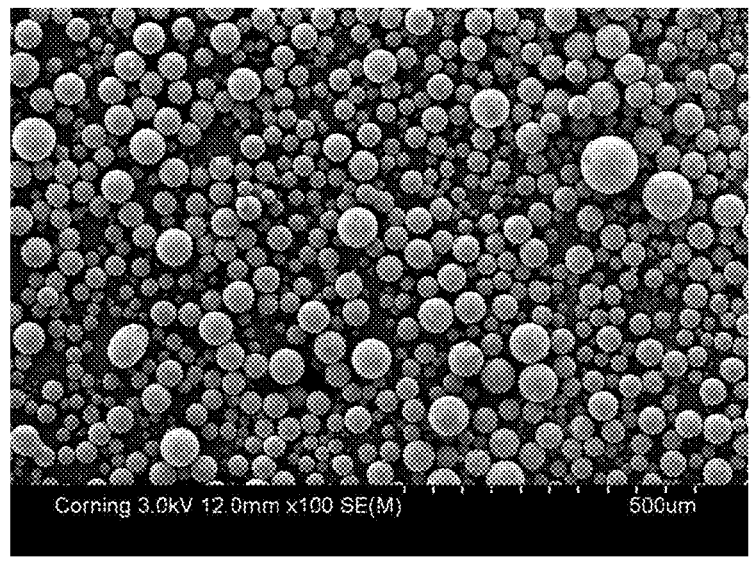
FIGS. 7A and 7B are SEM micrographs of $LiPF_6$-coated lithium metal particles according to one embodiment.
Figure 7B:
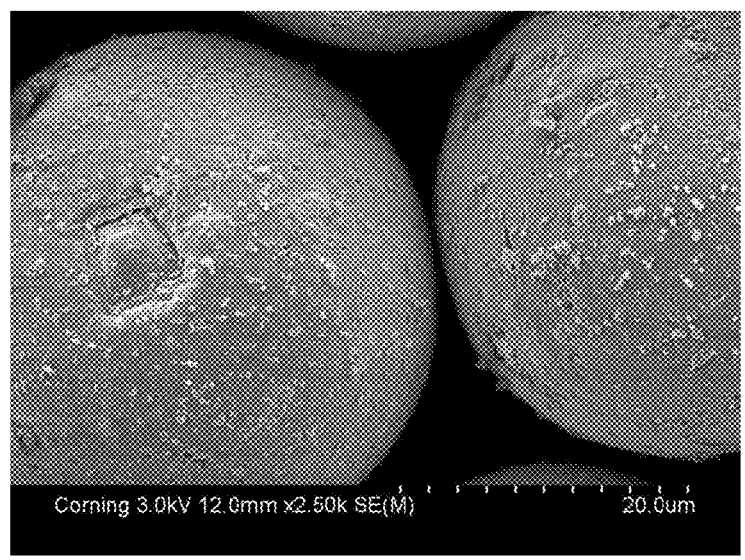

SEM micrographs of the coated particles are shown at high and low magnifications respectively in FIGS. 7A and 7B. Micrographs of the uncoated particles are not available due to their highly pyrophoric nature. In a 1 week evaluation, the coated particles remained stable at room temperature in air. In a further evaluation, the coated particles exhibited no reaction following overnight exposure in an oven at 150° C.

Example 4

The Example 3 experiment was repeated except using NMP as the solvent for LiPF$_6$. The sample was dried at 320° C. in a vacuum oven to remove the NMP. The resulting powder displayed comparable air stability to Example 3.

Example 5

Figure 8:
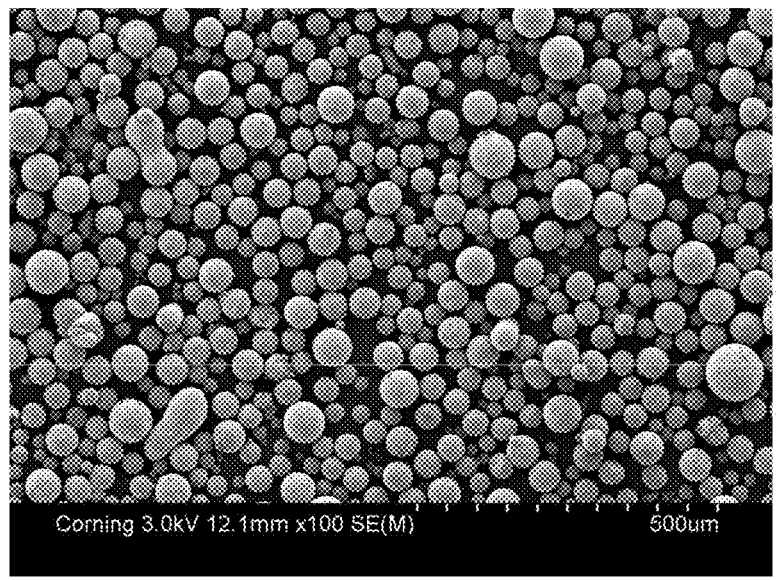
FIG. 8 is an SEM micrograph of $LiPF_6$-coated lithium metal particles according to a further embodiment.

The coating experiment was repeated with methylene chloride as solvent for LiPF$_6$ and results similar to examples 3 and 4 were obtained. An SEM micrograph of the coated particles is shown in FIG. 8.

In one embodiment, the lithium-ion capacitor may have a power density of at least about 1000 W/l (Watt/liter) such as at least about 500, 600, 700, 800, 900, or 1000 W/l), and an energy density of at least about 10 Wh/l (Watt-hour/liter) such as at least about 10, 20, 30, 40 or 50 Wh/l, at a current of about 0.05 A. In one embodiment, the lithium-ion capacitor may have a power density of at least about 1033.6 W/l and an energy density of at least about 12.3 Wh/l at a current of about 0.05 A.

As used herein, the singular forms "a," "an" and "the" include plural referents unless the context clearly dictates otherwise. Thus, for example, reference to a "glass" includes examples having two or more such "glasses" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present invention without departing from the spirit and scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

We claim:

1. A device comprising a cathode, an anode, a separator positioned between the cathode and the anode, lithium composite particles positioned between the anode and the separator, and an electrolyte solution, wherein
   the electrolyte solution comprises an electrolyte material dissolved in a solvent, and
   at least some of the lithium composite particles individually comprise a lithium metal core and a layer of a complex lithium salt encapsulating the core.

2. The device according to claim 1, wherein the cathode comprises activated carbon and the anode comprises graphite or hard carbon.

3. The device according to claim 1, wherein the anode comprises graphite, carbon black, hard carbon, coke, or combinations thereof.

4. The device according to claim 1, wherein the lithium composite particles are provided as a contiguous layer on a separator-facing surface of the anode.

5. The device according to claim 1, wherein the electrolyte material comprises the complex lithium salt.

6. The device according to claim 1, wherein the electrolyte material consists essentially of the complex lithium salt.

7. The device according to claim 1, wherein a weight ratio of lithium composite particles to anode material ranges from about 1:3 to 1:10.

8. A method of producing a lithium-ion capacitor, comprising:
   providing a cathode, an anode, a separator, a solvent, and a lithium composite material comprising lithium composite particles, wherein at least some of the lithium composite particles individually comprise a lithium metal core and a layer of a complex lithium salt encapsulating the core;
   positioning the separator between the cathode and the anode;
   positioning the lithium composite material between the anode and the separator to form an electrode set; and
   contacting the electrode set with the solvent.

9. The method of claim 8, wherein the solvent dissolves the complex lithium salt.

10. The method of claim 8, wherein the lithium composite particles have an average particle size of about 500 microns or less.

11. The method of claim 8, wherein the cathode comprises activated carbon and the anode comprises graphite or hard carbon.

12. The method of claim 8, wherein the lithium composite material is provided as a contiguous layer.

13. The method of claim 8, wherein the lithium composite material is provided as a contiguous layer on a separator-facing surface of the anode.

14. The method of claim 13, wherein hard carbon is produced by carbonizing a phenolic resin and washing the carbonized phenolic resin with ammonia and hydrochloric acid.

15. The method of claim 14, wherein the resin is carbonized at a temperature of at least about 1000° C.

16. A lithium-ion capacitor comprising a non-porous cathode, a non-porous anode, a separator positioned between the cathode and the anode, lithium composite particles positioned between the anode and the separator, and an electrolyte solution, wherein the electrolyte solution comprises an electrolyte material dissolved in a solvent, and
  at least some of the lithium composite particles individually comprise a lithium metal core and a layer of a salt encapsulating the core.

* * * * *